US007503095B2

(12) United States Patent
Lin et al.

(10) Patent No.: US 7,503,095 B2
(45) Date of Patent: Mar. 17, 2009

(54) NON-BRACKET WINDSHIELD WIPER

(75) Inventors: Sally Lin, 4F, No. 33, Lane 64, Sec. 1, Pei-Hsin Rd., Hsin-Tien, Taipei Hsien (TW); Yuan-Chin Ku, Taipei Hsien (TW)

(73) Assignee: Sally Lin, Taipei Hsien (TW)

( * ) Notice: Subject to any disclaimer, the term of this patent is extended or adjusted under 35 U.S.C. 154(b) by 0 days.

(21) Appl. No.: 11/948,238

(22) Filed: Nov. 30, 2007

(65) Prior Publication Data

US 2008/0295273 A1 Dec. 4, 2008

(30) Foreign Application Priority Data

Jun. 1, 2007 (TW) .............................. 96209033 U

(51) Int. Cl.
*B60S 1/38* (2006.01)
*B60S 1/40* (2006.01)

(52) U.S. Cl. .............................. 15/250.43; 15/250.201; 15/250.451; 15/250.452

(58) Field of Classification Search .............. 15/250.43, 15/250.201, 250.451, 250.452, 250.44, 250.361
See application file for complete search history.

(56) References Cited

U.S. PATENT DOCUMENTS 7,150,066 B1 * 12/2006 Huang ................... 15/250.201
2006/0026786 A1 * 2/2006 Ku .......................... 15/250.32
2007/0174989 A1 * 8/2007 Moll et al. ............. 15/250.201
2007/0175017 A1 * 8/2007 Kim ............................ 29/557
2008/0052865 A1 * 3/2008 Chiang .................... 15/250.43
2008/0201894 A1 * 8/2008 Ko ........................ 15/250.201

FOREIGN PATENT DOCUMENTS

WO 99/36300 * 7/1999

* cited by examiner

*Primary Examiner*—Gary K Graham
(74) *Attorney, Agent, or Firm*—Pai Patent & Trademark Law Firm; Chao-Chang David Pai

(57) ABSTRACT

A non-bracket windshield wiper includes an H-shaped and smoothly arched elastic metal bow strip having a middle neck and two longitudinal crevices at two sides of the neck, a holder frame mounted with a packing member and riveted to the middle part of the elastic metal bow strip for mounting to a windshield, two holding strips respectively coupled to the longitudinal crevices of the elastic metal bow strip, two back rubber strips respectively coupled to two top engagement structures of the holding strips, a rubber wiper blade coupled to two bottom engagement structures of the holding strips, and two end caps respectively capped on the two ends of the elastic metal bow strip.

7 Claims, 6 Drawing Sheets

NON-BRACKET WINDSHIELD WIPER

BACKGROUND OF THE INVENTION (a) Field of the Invention

The present invention relates to a windshield wiper and more particularly to a non-bracket windshield wiper.

(b) Description of the Prior Art

A conventional windshield wiper for automobile, as shown in FIG. 7, is comprised of a bracket structure holding a rubber blade 10. The bracket structure comprises an arm holder frame 201, two arms 202 respectively riveted to the two distal ends of the arm holder frame 201 with a respective rivet 402, and two extension strips 203 respectively riveted to the distal ends of the arms 202 with a respective rivet 402 to hold the rubber blades 10. Further, a pivot shaft 301 is transversely riveted to the arm holder frame 201 on the middle for mounting to a windshield. This design of windshield wiper has a complicated structure formed of multiple component parts. The fabrication and assembly process of this design of windshield wiper are complicated, resulting in a high manufacturing cost.

SUMMARY OF THE INVENTION

The present invention has been accomplished under the circumstances in view. It is one object of the present invention to provide a non-bracket windshield wiper which saves much material cost and is easy to assemble without rivets. It is another object of the present invention to provide a non-bracket windshield wiper which allows free replacement of the rubber blades. To achieve these and other objects of the present invention, the non-bracket windshield wiper comprises an H-shaped and smoothly arched elastic metal bow strip, which has a middle neck and two longitudinal crevices at two sides of the neck, a holder frame mounted with a packing member and affixed to the middle part of the elastic metal bow strip for mounting to a windshield, two holding strips respectively coupled to the longitudinal crevices of the elastic metal bow strip, two back rubber strips respectively coupled to two top engagement structures of the holding strips, a rubber wiper blade coupled to two bottom engagement structures of the holding strips, and two end caps respectively capped on the two ends of the elastic metal bow strip.

DETAILED DESCRIPTION OF THE PREFERRED EMBODIMENTS

Figure 1:
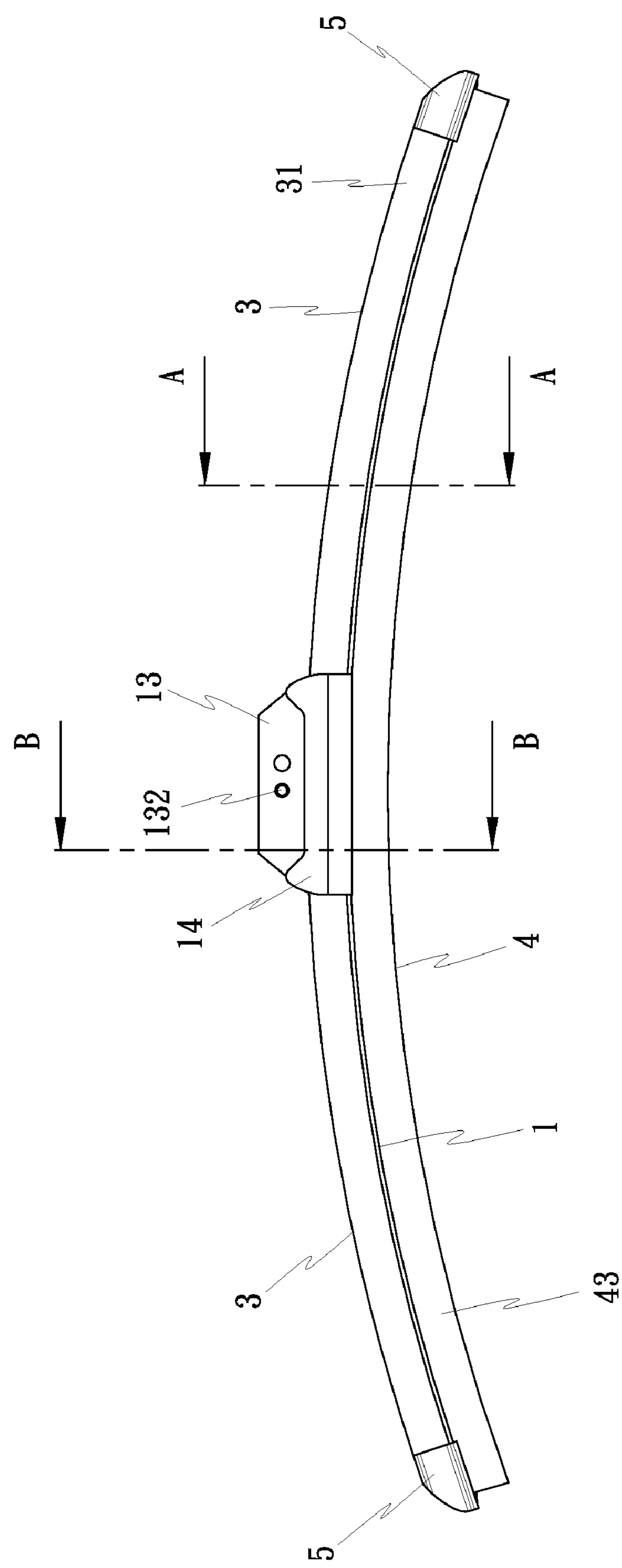
FIG. 1 is a sectional view of a non-bracket windshield wiper according to the present invention.
Figure 2:
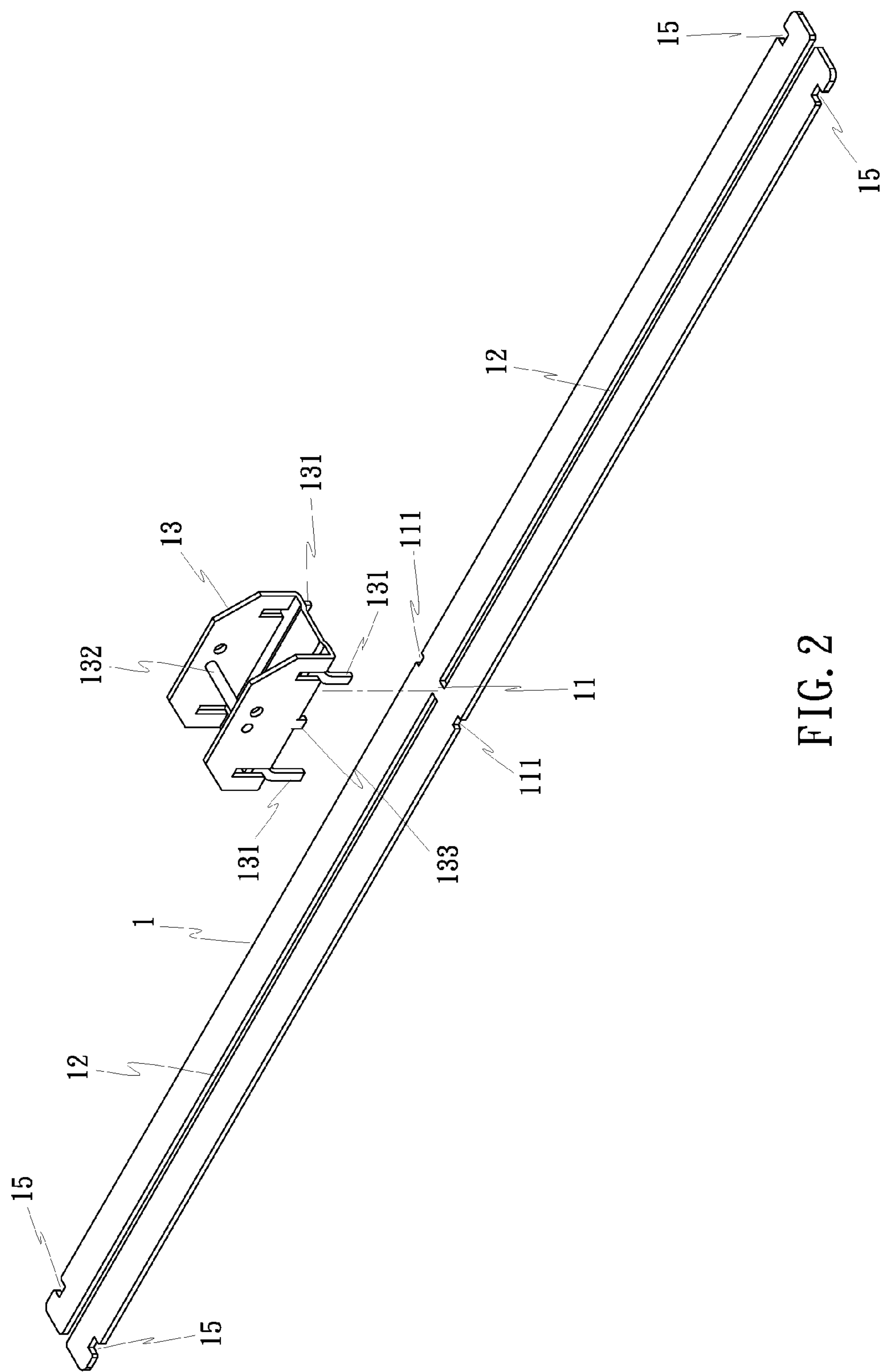
FIG. 2 is an exploded view of the elastic metal bow strip for the non-bracket windshield wiper according to the present invention.
Figure 3:
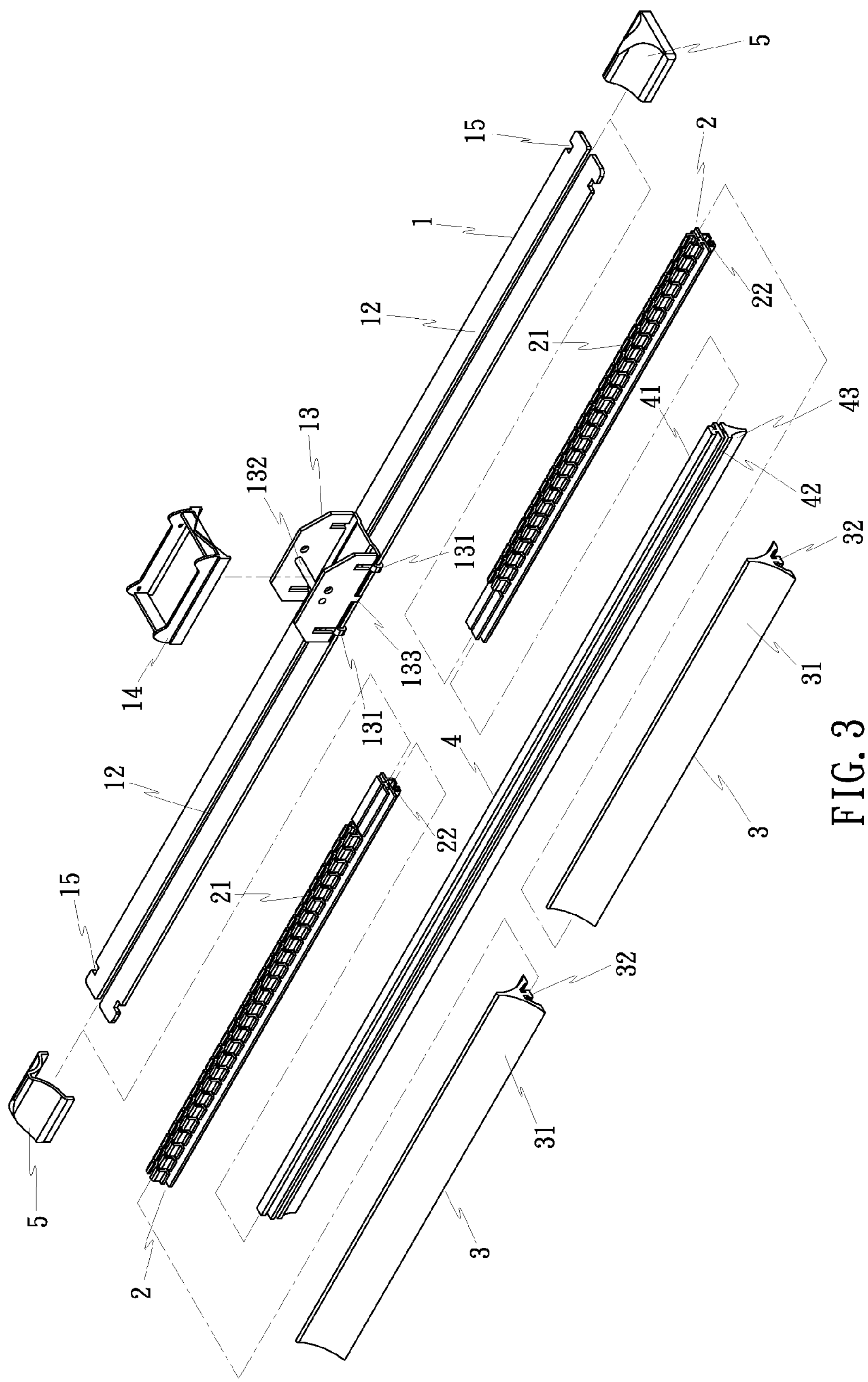
FIG. 3 is an exploded view of the non-bracket windshield wiper according to the present invention.

Referring to FIGS. 1~3, a non-bracket windshield wiper in accordance with the present invention comprises a elastic metal bow strip 1, two holding strips 2, two back rubber strips 3, a rubber wiper blade 4, and two end caps 5.

The elastic metal bow strip 1 has a neck 11 on the middle, two elongated crevices 12 longitudinally aligned at two sides of the neck 11 (see FIG. 2), two retaining notches 111 on the two opposite lateral side edges thereof corresponding to the neck 11, for the mounting of a holder frame 13, which is mounted with a rubber packing member 14 (see FIG. 3). FIGS. 2 and 3 show the elastic metal bow strip 1 straightly extended out. Before application, the elastic metal bow strip 1 is stamped into a smoothly arched shape (see FIG. 1). Further, the elastic metal bow strip 1 has a hook notch 15 at each of the two opposite sides of the two opposite ends.

Figure 4:
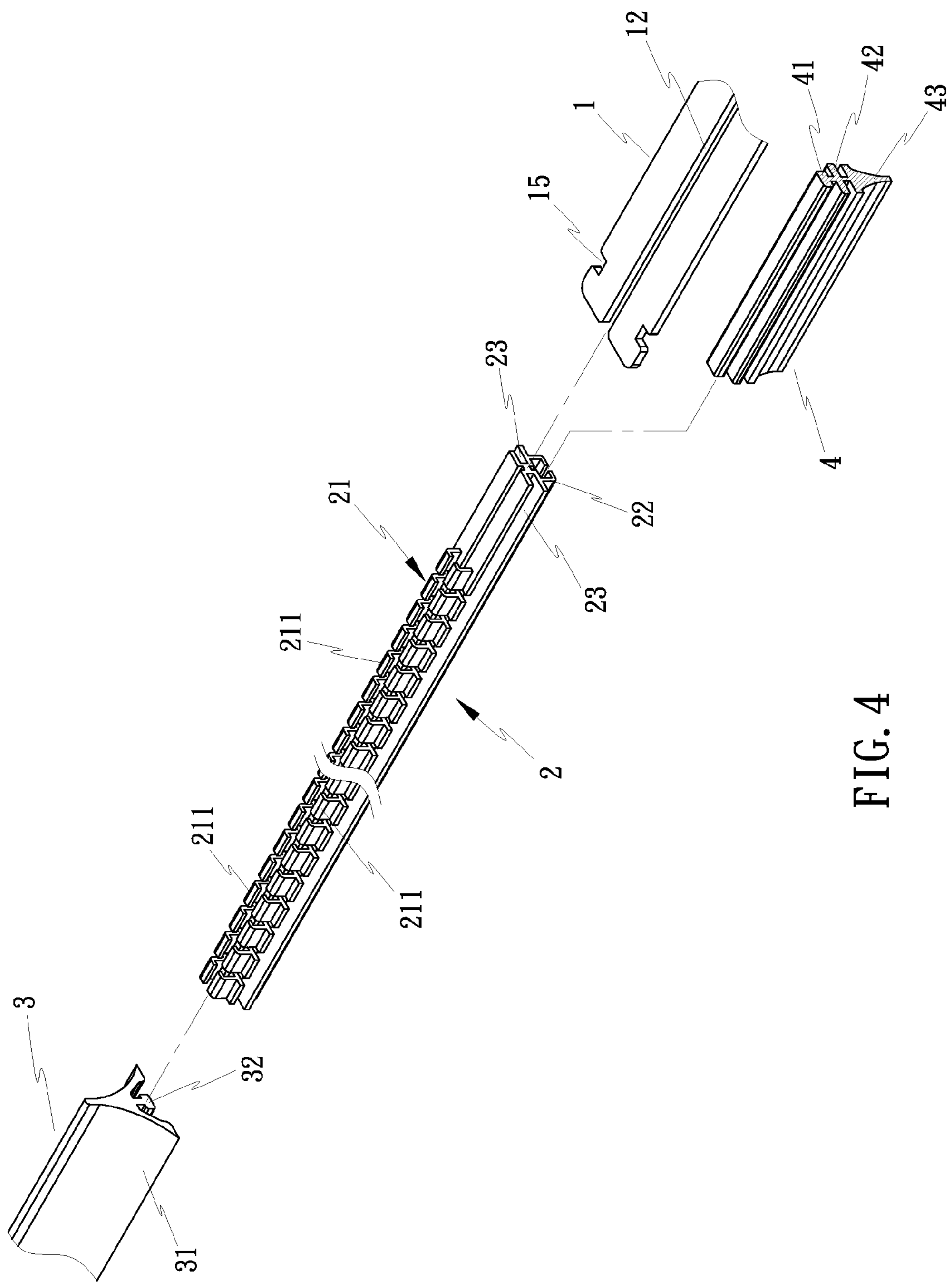
FIG. 4 is an exploded view of a part of the non-bracket windshield wiper according to the present invention.
Figure 5:
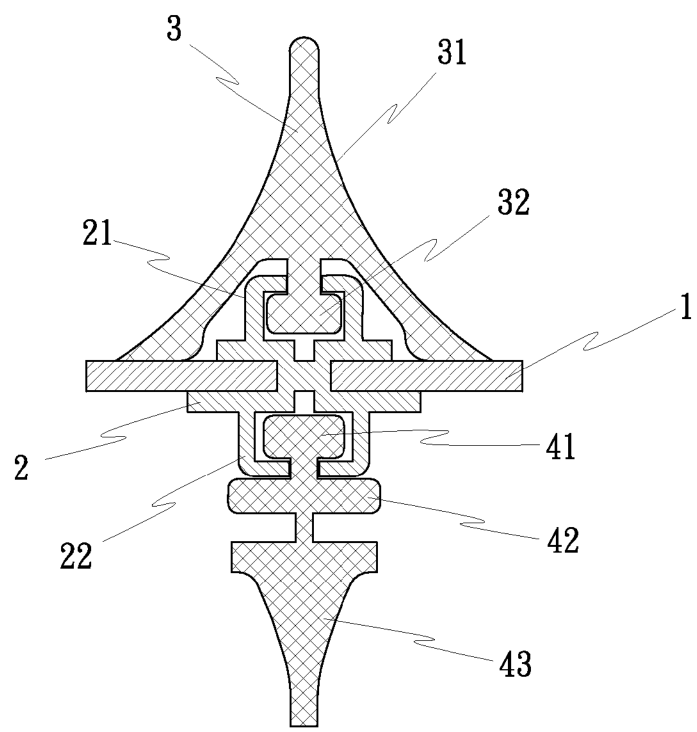
FIG. 5 is a sectional view taken along line A-A of FIG. 1.

The two holding strips 2, as shown in FIG. 3 and FIG. 4, are preferably made of a flexible plastic material, each having a top engagement structure 21 and a bottom engagement structure 22 symmetrically disposed at the top and bottom sides, and two coupling grooves 23 extending along the length and symmetrically disposed at the two opposite lateral sides. The holding strips 2 are respectively inserted into the elongated crevices 12 of the elastic metal bow strip 1 to force the coupling grooves 23 into engagement with the elastic metal bow strip 1 (see FIG. 5). The top engagement structure 21 comprises a plurality of pairs of engagement blocks 211 arranged in two rows for securing the back rubber strips 3. The bottom engagement structure 22 is formed of two hook strips arranged in parallel for securing the rubber wiper blade 4.

Each back rubber strip 3 has two sidewalls 31 that are smoothly inwardly arched in transverse direction and joined at the top side, and a coupling rail 32 longitudinally disposed at the bottom side between the two sidewalls 31. By means of forcing the coupling rails 32 of the back rubber strips 3 into engagement with the pairs of engagement blocks 211, the back rubber strips 3 are coupled to the holding strips 2 (See FIG. 5). The coupling rail 32 can be an integrated rail, or formed of a plurality of separated segments. Further, the two smoothly arched sidewalls 31 can be made to have an equal height and equal curvature. Alternatively, the two smoothly arched sidewalls 31 can be made to have different heights and different curvatures. According to this embodiment, the two smoothly arched sidewalls 31 have an equal height and equal curvature.

The rubber wiper blade 4 is a narrow rubber strip having a predetermined length. In the embodiment shown in FIG. 3 and FIG. 4, the rubber wiper blade 4 has a buffer strip 42 longitudinally disposed on the middle, a coupling rail 41 longitudinally disposed at the top side of the buffer strip 42, and a tapered wiping blade body 43 longitudinally disposed at the bottom side of the buffer strip 42. By forcing the coupling rail 41 of the rubber wiper blade 4 into engagement with the bottom engagement structure 22, the rubber wiper blade 4 is coupled to the holding strips 2 (see FIG. 5).

The two end caps 5 are respectively capped on the two distal ends of the elastic metal bow strip 1 and forced into engagement with the hook notches 15 and respectively abutted against the distal ends of the back rubber strips 3.

As indicated above, the invention uses the elastic metal bow strip 1, the two holding strips 2, the two back rubber strips 3, the rubber wiper blade 4 and the two end caps 5 to constitute a non-bracket windshield wiper for attaching to a windshield to maintain clear vision of the windshield. The installation of the non-bracket windshield wiper is simple without the use of any rivets, thus saving much material and installation cost. Further, the invention allows easy replacement of the rubber wiper blade 4.

Figure 6:
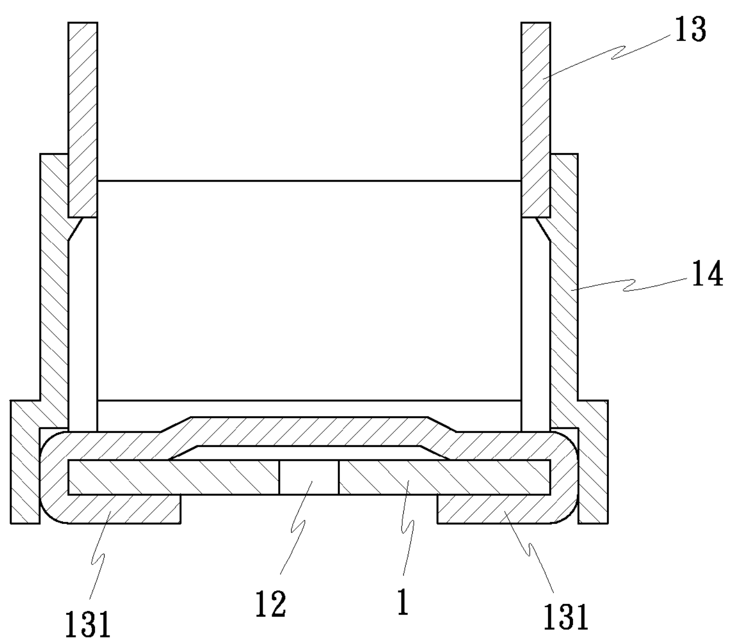
FIG. 6 is a sectional view taken along line B-B of FIG. 1.
Figure 7:
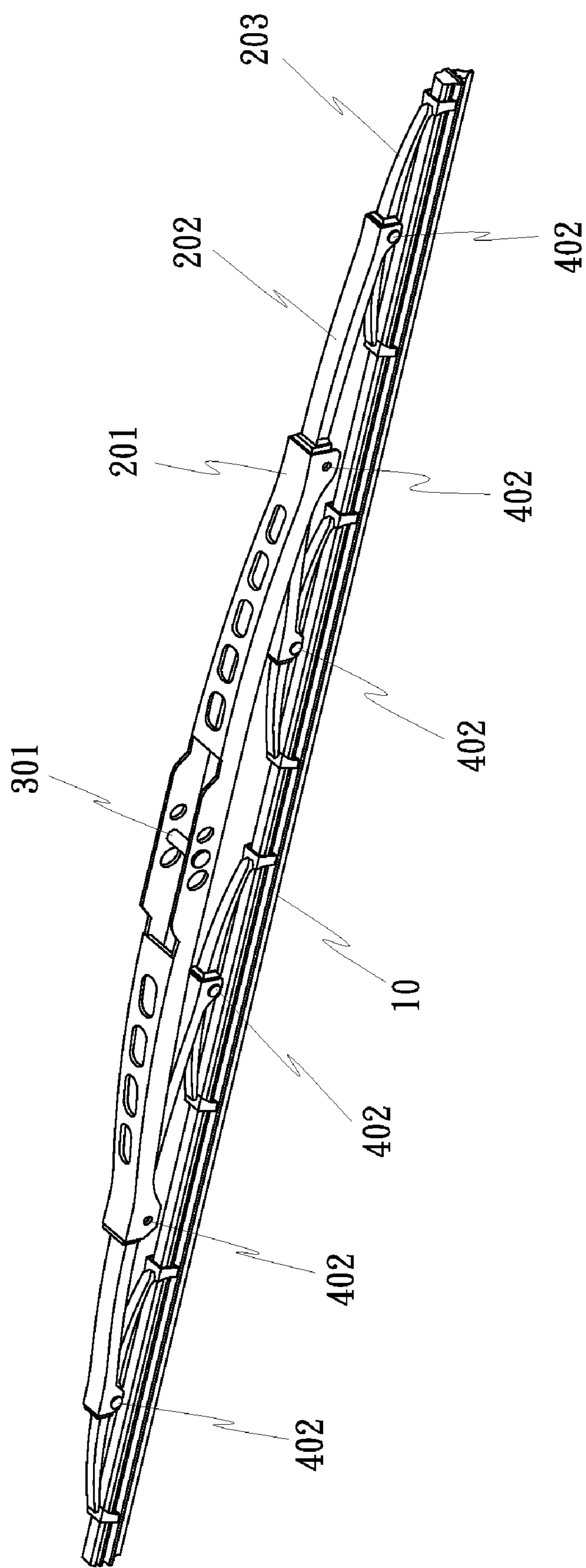
FIG. 7 is a perspective view of a windshield wiper according to the prior art.

FIG. 6 illustrates the connection between the holder frame 13 and the rubber protector 14. As illustrated, the holder frame 13 has two engagement blocks 133 symmetrically disposed at two opposite lateral sides and respectively engaged into the retaining notches 111 of the elastic metal bow strip 1, a plurality of bottom mounting legs 131 symmetrically disposed at two sides that are respectively hammered down and firmly secured to the bottom side of the elastic metal bow strip 1 after the engagement blocks 133 are engaged into the respective retaining notches 111, and a pivot shaft 132 transversely disposed at the top for mounting to a windshield.

A prototype of non-bracket windshield wiper has been constructed with the features of FIGS. 1~6. The non-bracket windshield wiper functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A non-bracket windshield wiper comprising an elastic metal bow strip, two continuous holding strips, two back rubber strips, a rubber wiper blade, and two end caps, wherein:

said elastic metal bow strip has a neck transversely disposed on a middle part thereof and two elongated crevices longitudinally aligned at two sides of said neck, each crevice extending to a respective free end of the metal bow strip to define an open end thereof;

said two holding strips are respectively inserted into the elongated crevices of said elastic metal bow strip, each of said holding strips having a top engagement structure and a continuous bottom engagement structure symmetrically disposed at top and bottom sides thereof, and two continuous coupling grooves extending along the length thereof and symmetrically disposed at two opposite lateral sides thereof and respectively receiving a respective part of said elastic metal bow strip therein at two sides of the corresponding elongated crevice;

each of said two back rubber strips has two sidewalls that are smoothly inwardly arched in transverse direction and joined at a top side, and a coupling rail longitudinally disposed at a bottom side thereof between the two smoothly inwardly arched sidewalls and forced into engagement with the top engagement structure of one of said holding strips;

said rubber wiper blade has a coupling rail forced into engagement with the bottom engagement structures of said holding strips; and said two end caps are respectively capped on two distal ends of said elastic metal bow strip.

2. The non-bracket windshield wiper as claimed in claim 1, wherein said elastic metal bow strip has a holder frame fastened to the middle part thereof and mounted with a rubber packing member for mounting to a windshield.

3. The non-bracket windshield wiper as claimed in claim 1, wherein said elastic metal bow strip has a plurality of hook notches symmetrically disposed at two distal ends thereof for securing said end caps.

4. The non-bracket windshield wiper as claimed in claim 1, wherein said holding strips are made of plastics.

5. The non-bracket windshield wiper as claimed in claim 1, wherein the top engagement structure of each of said holding strips comprises a plurality of pairs of engagement blocks symmetrically arranged in two lines.

6. The non-bracket windshield wiper as claimed in claim 1, wherein the bottom engagement structure of each of said holding strips comprises two hook strips arranged in parallel for securing said rubber wiper blade.

7. The non-bracket windshield wiper as claimed in claim 1, said rubber wiper blade further comprising a buffer strip longitudinally disposed at a middle part thereof and a tapered wiping blade body longitudinally disposed at a bottom side of said buffer strip, wherein said coupling rail is longitudinally disposed at a top side of said buffer strip.

* * * * *